US011790000B2

(12) United States Patent
Chau et al.

(10) Patent No.: US 11,790,000 B2
(45) Date of Patent: Oct. 17, 2023

(54) CONTACT CENTER PRIVATE WEB SESSIONS

(71) Applicant: Zoom Video Communications, Inc., San Jose, CA (US)

(72) Inventors: Vi Dinh Chau, Seattle, WA (US); Jin Li, Los Gatos, CA (US); Xu Hua Li, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/507,331

(22) Filed: Oct. 21, 2021

(65) Prior Publication Data

US 2022/0247972 A1    Aug. 4, 2022

Related U.S. Application Data

(63) Continuation of application No. 17/163,238, filed on Jan. 29, 2021, now Pat. No. 11,172,163.

(51) Int. Cl.
*H04N 7/14* (2006.01)
*G06F 16/738* (2019.01)
*G06Q 30/01* (2023.01)
*G06Q 10/10* (2023.01)
*H04N 7/15* (2006.01)

(52) U.S. Cl.
CPC ........... *G06F 16/738* (2019.01); *G06Q 10/10* (2013.01); *G06Q 30/01* (2013.01); *H04N 7/147* (2013.01)

(58) Field of Classification Search
CPC ...... G06F 16/738; G06Q 10/10; G06Q 30/01; H04N 7/147
See application file for complete search history.

(56) References Cited

U.S. PATENT DOCUMENTS

| | | | |
|---|---|---|---|
| 6,738,817 B1* | 5/2004 | Chen | G06F 3/14 709/227 |
| 6,941,371 B2* | 9/2005 | Hartmann | G06F 3/14 709/227 |
| 7,023,979 B1* | 4/2006 | Wu | H04M 3/5233 379/265.11 |
| 7,881,957 B1* | 2/2011 | Cohen | G06Q 30/08 |
| 8,253,771 B2 | 8/2012 | Lammers | |
| 8,731,180 B2 | 5/2014 | Benefield et al. | |
| 8,842,818 B2* | 9/2014 | Alperin | H04M 3/5233 379/265.06 |

(Continued)

FOREIGN PATENT DOCUMENTS

WO    WO-0122693 A2 *    3/2001    .......... H04M 3/5191

OTHER PUBLICATIONS

International Search Report and Written Opinion dated Mar. 18, 2022 in corresponding PCT application PCT/US2022/014290, 158 pages.

*Primary Examiner* — Nicholas Augustine
(74) *Attorney, Agent, or Firm* — Young Basile Hanlon & MacFarlane, P.C.

(57) ABSTRACT

A method includes receiving a request for an interaction with an agent of a contact center. The method includes establishing a private web session when the agent is unavailable. The method includes determining an estimated wait time for the interaction. The method includes selecting visual content based on matching the estimated wait time with one or more visual content items. The method includes outputting the visual content to the private web session.

20 Claims, 9 Drawing Sheets

(56) References Cited

U.S. PATENT DOCUMENTS

| | | | |
|---|---|---|---|
| 9,076,448 B2* | 7/2015 | Bennett | G10L 15/30 |
| 9,344,674 B2 | 5/2016 | Talbot | |
| 9,516,265 B2 | 12/2016 | Durante et al. | |
| 10,176,366 B1* | 1/2019 | Maxwell | G06V 40/20 |
| 2001/0047417 A1* | 11/2001 | Hartmann | G06F 3/14 |
| | | | 709/227 |
| 2004/0010574 A1* | 1/2004 | Cammick | H04L 41/0853 |
| | | | 709/228 |
| 2004/0028212 A1* | 2/2004 | Lok | H04L 67/565 |
| | | | 379/265.09 |
| 2004/0117376 A1* | 6/2004 | Lavin | G06Q 30/06 |
| 2005/0063530 A1* | 3/2005 | Cook | H04L 69/329 |
| | | | 379/265.09 |
| 2007/0219842 A1* | 9/2007 | Bansal | G06F 3/0484 |
| | | | 715/810 |
| 2013/0050199 A1* | 2/2013 | Chavez | G06Q 10/101 |
| | | | 345/419 |
| 2013/0093830 A1* | 4/2013 | Richardson | H04M 3/5183 |
| | | | 348/14.01 |
| 2014/0211933 A1* | 7/2014 | Vymenets | G06Q 10/10 |
| | | | 379/265.06 |
| 2014/0233719 A1* | 8/2014 | Vymenets | G06F 3/048 |
| | | | 379/265.03 |
| 2015/0208030 A1 | 7/2015 | Durante et al. | |
| 2015/0227941 A1* | 8/2015 | Tuchman | H04M 3/5183 |
| | | | 705/7.14 |
| 2016/0155163 A1* | 6/2016 | White | G06Q 30/0611 |
| | | | 705/26.2 |
| 2016/0277577 A1* | 9/2016 | Yentis | G06F 40/169 |
| 2020/0280635 A1 | 9/2020 | Barinov et al. | |

\* cited by examiner

CONTACT CENTER PRIVATE WEB SESSIONS

CROSS-REFERENCE TO RELATED APPLICATION(S)

This application claims priority to and the benefit of U.S. patent application Ser. No. 17/163,238, filed Jan. 21, 2021, the entire disclosure of which is hereby incorporated by reference.

BACKGROUND

Virtual meetings help people all around the world to connect with one another every day in a variety of business and personal settings. A virtual meeting may be video-enabled to allow participants to see each other in real-time and may also accommodate participants interacting with others through audio alone. Virtual meeting platforms use network connections with participant devices to facilitate audio and/or video communications between participants. The growing ubiquity of network-connected devices enables more and more people to communicate over virtual meetings every day.

SUMMARY

Disclosed herein are, inter alia, implementations of systems and techniques for video call queues.

One aspect of this disclosure is a video call queue method that may include receiving a request for a video meeting. The method may include determining an agent category. The agent category may be determined based on the request. The method may include determining whether an agent is available. Determining whether the agent is available may be based on the agent category. If the agent is not available, the method may include establishing a private web session. The method may include determining an estimated wait time. The method may include displaying content to the web session based on the estimated wait time. If the agent is available, the method may include initiating the video meeting.

Another aspect of this disclosure is a video call queue system that includes a ticket system, an interaction tool, a task router, and a video handler. The ticket system may be configured to receive a request for a video meeting. The interaction tool may be configured to determine an agent category based on the request. The task router may be configured to determine whether an agent is available based on the agent category. The task router may be configured to determine an estimated wait time. The video handler may be configured to establish a private web session if the agent is not available. The video handler may be configured to display content to the private web session based on the estimated wait time. The video handler may be configured to establish a meeting channel for the video meeting if the agent is available.

Another aspect of this disclosure is a method for content selection for a video call queue. The method may include receiving an input. The method may include determining a content category based on the input. The method may include searching a data store for content based on the content category and an estimated wait time. The method may include prioritizing the searched content based on a relevance score associated with the input to obtain a selected content. The method may include displaying the selected content based on the relevance score.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Various interactions may be used in a contact center or enterprise context. For example, a request for help from a user may begin with a user calling into a contact center (e.g., via a softphone or through a client application on a mobile phone) or sending a chat message, which in either case routes the user to a web service used to implement a video call queue. For example, a user may want to initiate a video meeting with an agent at a contact center for a more personalized experience. In an enterprise context example, a user may want to initiate a video meeting with a medical office, for example in a telehealth scenario. In another example, an operator of a device registered with a unified communications as a service (UCaaS) platform may seek assistance with respect to the device or with the software of the platform. In another example, a customer or client of a merchant or service provider may want to speak with a representative or professional to assist in an inquiry, such as an inquiry related to an order or return, an inquiry related to a reservation, or an inquiry related to a product or service.

As the popularity of video meetings in these settings increases, so does the need for efficiently handling the user traffic and providing a seamless experience for the user. Implementations of this disclosure address problems such as these using video call queues. Video call queues can provide a rich and seamless experience while the user waits for their video meeting to begin. The video call queues can be used to gather information from the user, for example to shorten the interaction time. The video call queues can be used to provide information to the user, and in some examples, may be interactive. The video call queues can be used to provide visual information such as images and videos. The video call queues can be used to create a pseudo-interaction experience such that the gathering and display of information provides the user with a feeling that the interaction has begun before actual interaction with an agent.

As with typical telephone call queues, video call queues can result in wasted time and an undesirable user experience as the user waits for their video meeting to begin. Implementations of this disclosure address problems such as these by providing the user with useful visual content as they wait in a video call queue, gathering relevant information for the interaction, or providing entertainment. The visual content may be tailored to the specific issue that the user wants addressed, and may be used to provide a pseudo-meeting experience before the actual interaction begins.

Figure 1:
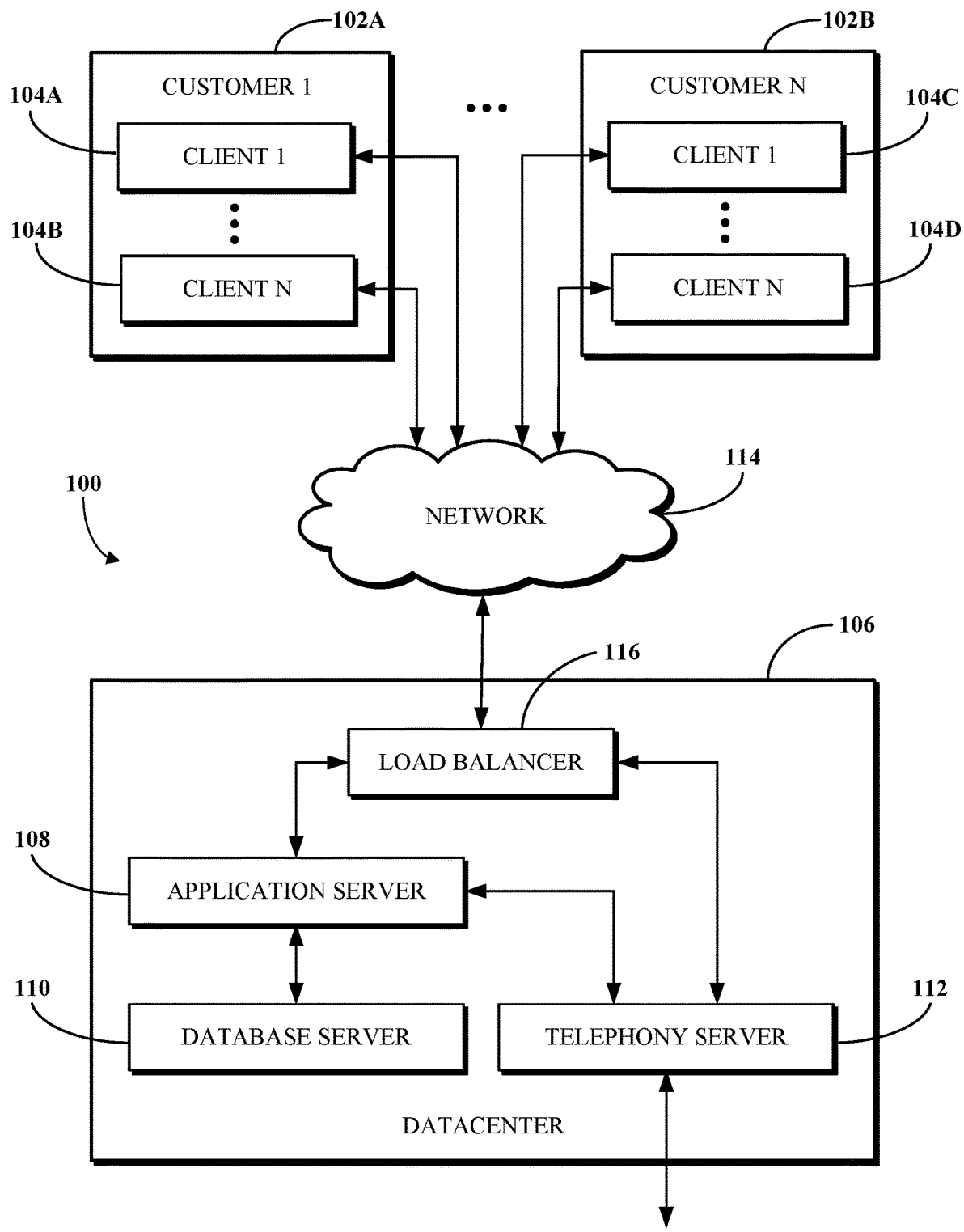
FIG. 1 is a block diagram of an example of an electronic computing and communications system.

To describe some implementations in greater detail, reference is first made to examples of hardware and software structures used to implement an video call queue. In some examples, the video call queue may be interactive. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106.

Figure 2:
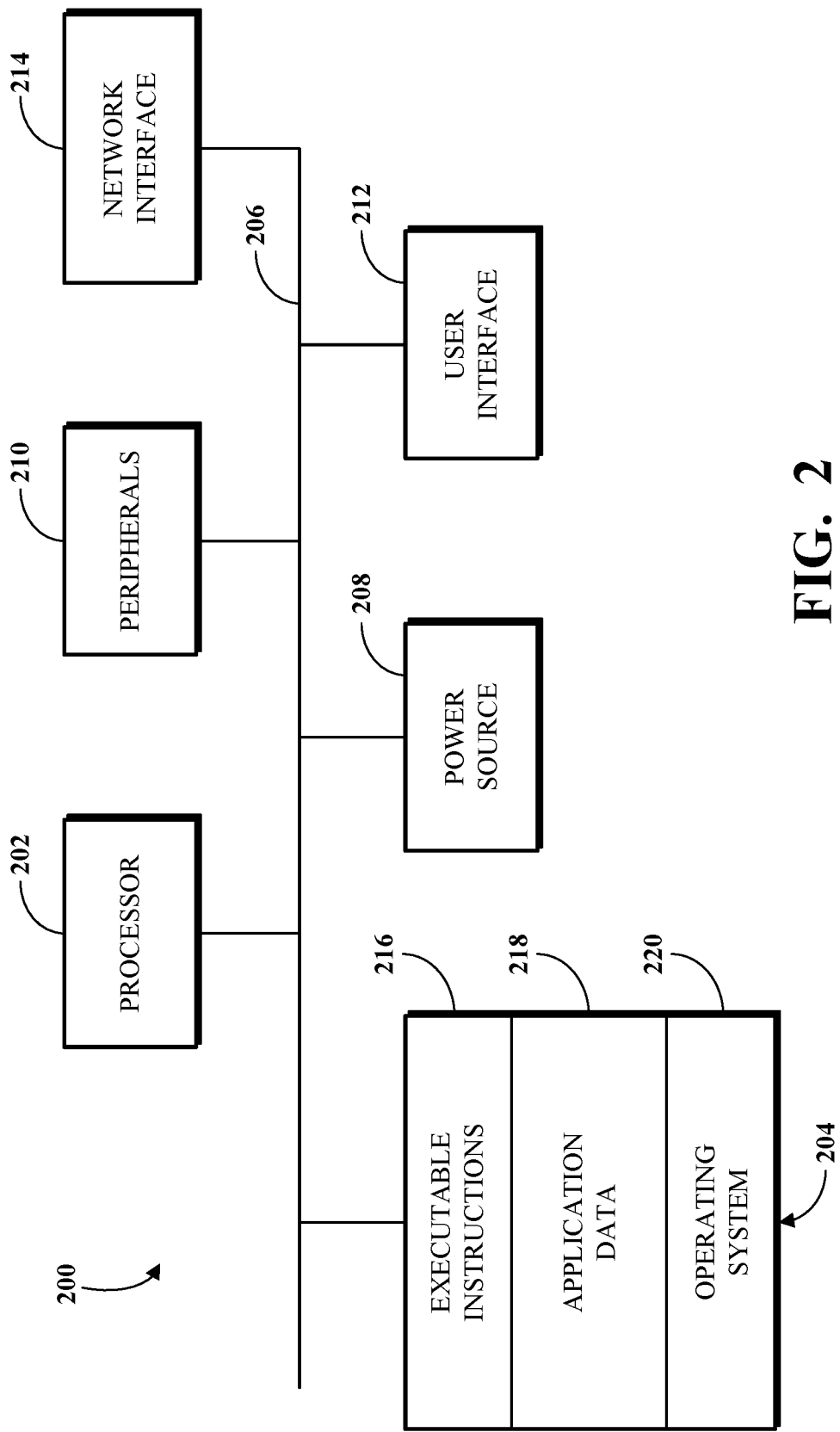
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
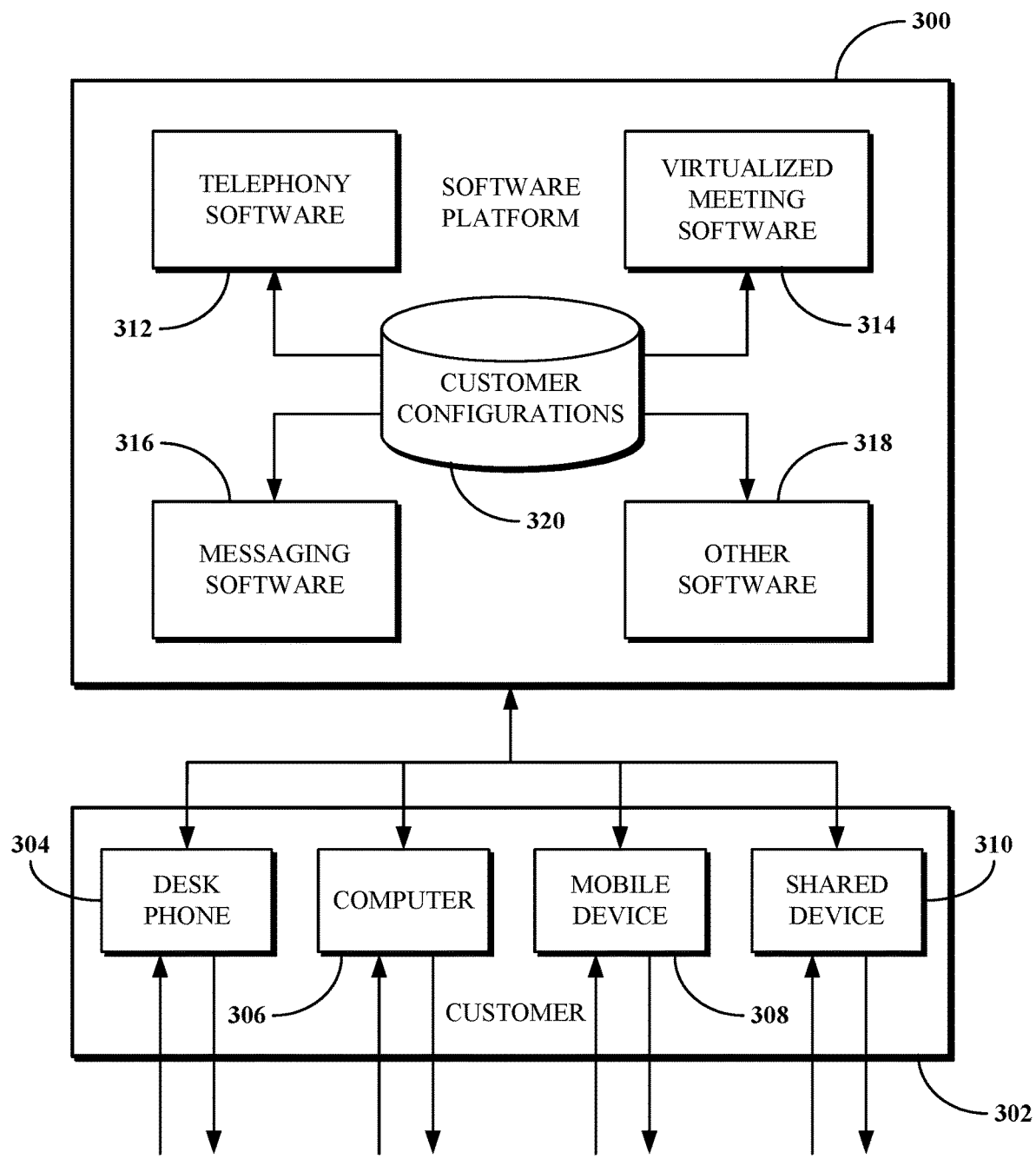
FIG. 3 is a block diagram of an example of a meeting system for delivering virtual meeting software services in an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, virtualized meeting software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. For example, the telephony software 312 may be implemented using one or more both of an application server and a telephony server, such as the application server 108 and the telephony server 112 shown in FIG. 1. Calls sent or received using the telephony software 312 may, for example, be sent or received using the desk phone 304, a softphone running on the computer 306, a mobile application running on the mobile device 308, or using the shared device 310 where same includes telephony features.

The virtualized meeting software 314 enables audio, video, and/or other forms of virtualized meetings between multiple devices, such as to facilitate a conference between the users of those devices. The virtualized meeting software 314 can include functionality for hosting, presenting scheduling, joining, or otherwise participating in a virtualized meeting. The virtualized meeting software 314 may further include functionality for recording some or all of a virtualized meeting and/or documenting a transcript for the virtualized meeting.

The messaging software 316 enables instant messaging, unified messaging, and other types of messaging communications between multiple devices, such as to facilitate a chat or like virtual conversation between users of those devices.

The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include private web session based video call queues.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a virtualized meeting. In yet another example, the virtualized meeting software 314 may include functionality for sending and receiving instant messages between participants and/or other users of the customer 302. In yet another example, the virtualized meeting software 314 may include functionality for file sharing between participants and/or other users of the customer 302. In some implementations, some or all of the software 312 through 318 may be combined into a single software application run on clients of the customer, such as one or more of the clients 304-310.

An interaction may include a virtual meeting, an short messaging service (SMS) interaction, a chat interaction, a voice (i.e., phone) interaction, or any combination thereof. A virtual meeting may be referred to as a video-enabled virtual meeting in which video streaming is enabled for one or more participants. The enabling of video streaming for a participant of a virtual meeting does not require that the participant activate or otherwise use video functionality for participating in the virtual meeting. For example, a virtual meeting may still be a video-enabled virtual meeting where none of the participants joining using clients turns on their video feed for any portion of the virtual meeting. In some cases, however, the virtual meeting may have video disabled, such as where each participant connects to the virtual meeting using a phone rather than a client, or where a host of the virtual meeting selectively configures the virtual meeting to exclude video functionality.

In some implementations, other software services may be accessible in connection with a virtual meeting implemented using the software platform 300. For example, a virtual meeting may include or otherwise integrate functionality for instant messaging, unified messaging, and other types of messaging communications between participants of the virtual meeting, such as to facilitate a chat or like virtual conversation between users of those participants. Those other software services may be implemented at the software platform 300 and/or a different aspect of the system 100.

Figure 4:
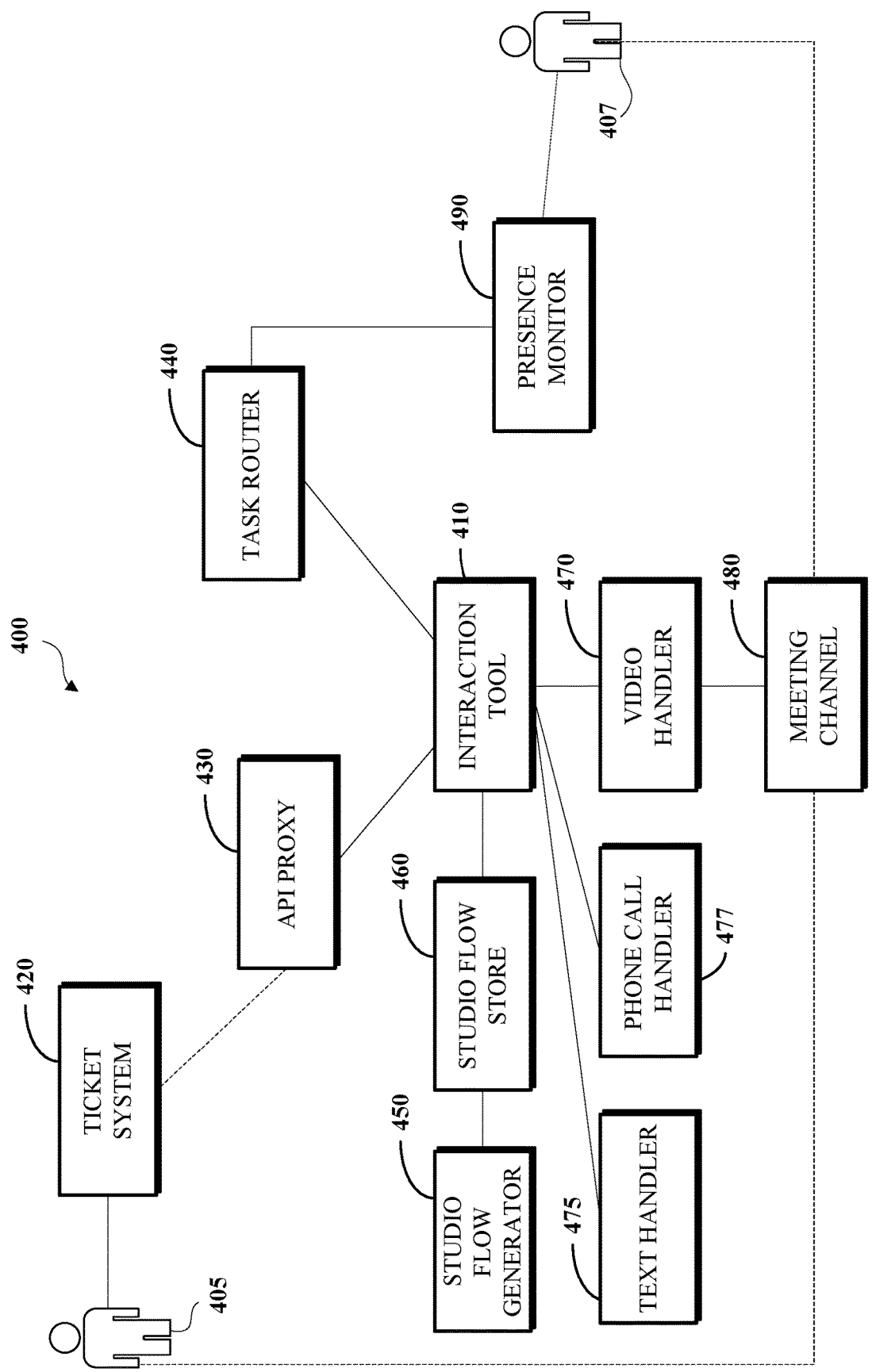
FIG. 4 is a block diagram of an example of a video call queuing system.

FIG. 4 is a block diagram of an example of a video call queuing system 400. The video call queuing system 400 may be implemented on the software platform 300 shown in FIG. 3. The video call queuing system 400 can provide a rich and seamless experience while the user waits for their video meeting or other interaction to begin. The video call queuing system 400 can be used to gather information from the user, for example to shorten the interaction time. The video call queuing system 400 can be used to provide information to the user, and in some examples, may be interactive. The video call queuing system 400 can be used to provide visual information such as images and videos. The video call queuing system 400 can be used to create a pseudo-interaction experience such that the gathering and display of information provides the user with a feeling that the interaction has begun before actual interaction with an agent.

The video call queuing system 400 may be used to connect a user 405 with a selected agent 407, who may be one of many agents working to respond to user requests over the video call queueing system 400. In some examples, the agent 407 may be a software agent that is configured to address the user inquiries in real-time, for example using a knowledge base or like resource of the platform. For example, where the interaction between the user 405 and the agent 407 is over a video meeting, a video showing a portion or all of a humanoid figure may be output to a display of the device of the user in lieu of a video of an actual human. As shown in FIG. 4, the video call queuing system 400 includes an interaction tool 410, a ticket system 420, an application programming interface (API) proxy 430, a task router 440, a studio flow generator 450, a studio flow store 460, a video handler 470 such as virtualized meeting software 314 shown in FIG. 3, a text handler 475 such as messaging software 316 shown in FIG. 3, a phone call handler 477 such as telephony software 312 shown in FIG. 3, a meeting channel 480, and a presence monitor 490. The text handler 475 may be configured to support a third party chat, an email channel, an SMS channel, a client (i.e., customer) instant messaging (IM) channel, or any combination thereof. The phone call handler 477 may be configured to support a phone channel.

As shown in FIG. 4, the user may transmit a request for an interaction with an agent of a contact center. The request may, for example, be a request for a video meeting with an agent, a request for a telephone call with an agent, a request for a chat with an agent, or the like. The particular manner of the request may be based on the manner in which the request is transmitted. For example, where the user 405 is making a telephone call to the contact center, the request may be a request for a telephone call with an agent. In another example, where the user 405 is initiating a video meeting with a contact center, the request may be a request for a video meeting with an agent. The request may include a category field that indicates a reason for the interaction. For example, the category field may indicate that the user is having a problem or issue with a purchased item, an order, a device. The category field may indicate that the user is having a health issue or any other issue for which the user may want to speak to an agent. In some examples, the category field may indicate a department within an organization that the user 405 wishes to connect with via an interaction. The request may be transmitted via a web portal to the ticket system 420. The ticket system 420 may be a customer relationship management (CRM) tool or may be integrated with a CRM. The ticket system 420 may encode the request with some metadata from the CRM. For example, the ticket system 420 may encode the request with information associated with the user, for example, username, user address, user membership status, user priority, user purchase history, user call history, or the like. The API proxy 430 is an interface for accessing the interaction tool 410. The interaction tool 410 may be configured to manage and track the video call queue.

The interaction tool 410 is configured to receive the request from the ticket system 420 via the API proxy 430. The interaction tool 410 is configured to determine an agent category. The agent category may be determined based on the request. The agent category may include information about the nature of the request to aid in determining an appropriate agent to handle the interaction. The interaction tool 410 may determine the agent category by matching one or more skills of the agent with the information associated with category field of the request. The one or more skills of the agent may include expertise in certain software of a UCaaS platform, technical support versus marketing, specialty in addressing billing questions or scheduling appointments, technical expertise, marketing expertise, or the like, for example. In an example, if the request indicates that the user 405 is having an issue with a dishwasher, the interaction tool 410 may match the user with an agent that has knowledge of dishwashers.

The interaction tool 410 may query the task router 440 to determine whether an appropriate agent is available. The presence monitor 490 is configured to manage and update the status of the agents. The presence monitor 490 is used for agent load management and may be configured to provide a history report or an agent's presence, a live report of an agent's presence, or both, to a supervisor of an agent. The history report may be used to determine if the agent will be available based on a learned history of the agent's habits. For example, if the agent typically is on break at a certain time every day, that information may be used to determine agent availability. The live report may be based on whether the agent is currently engaged with a user on an interaction. The live report may be based on sensor data, for example an occupancy sensor or a camera positioned at the agent's workstation, to determine whether the agent is present at the workstation. For example, the agent status may indicate whether an agent is available, busy, or away. The task router 440 may query the presence monitor 490 to determine which agents are available. The task router 440 may select one of the available agents and notify the interaction tool 410 of the selection. If the selected agent 407 is not immediately available, the interaction tool 410 may notify the video handler 470 to generate a private web session between the user and the selected agent. In some examples, the video handler 470 may facilitate the video output in which the private web session is generated elsewhere. The task router 440 may also determine an estimated wait time if the selected agent is not immediately available. The estimated wait time may be based on the number of users in the video call queue, the types of issues that the users in the video call queue are having, estimated time to resolve those issues based on previous interaction data, or any combination thereof. The estimated wait time may be determined using machine learning techniques.

The video handler 470 is configured to receive a notification from the interaction tool 410 that includes an indication to generate a private web session between the user and the selected agent 407. The notification may include metadata associated with the user. The video handler 470 may be configured to send a notification to the selected agent 407 that they have been assigned a user with whom to initiate an interaction. A notification may be sent in the form of an instant message, an SMS message, an email, an audible notification, or a video notification. In an example where there are multiple agents selected, the notification may be sent to all the selected agents so that the first available selected agent can handle the ticket to engage the user 405. The notification to the selected agent 407 may be transmitted via the interaction tool 410 and task router 440.

Content may be generated by the studio flow generator 450 and stored in a knowledgebase, such as the studio flow store 460. The content may include images, videos, questionnaires, games, and the like. The content may be interactive. The content may include an indication of how many other callers are ahead of the user 405, for example generally or for the selected agent or team of agents. The interaction tool 410 may select content from the studio flow store 460 based on the request, the estimated wait time, or both. The content may be selected based on a frequently asked question, selected based on the category field, past interactions (e.g., closed or still-open tickets) with the same user, based on the services limited to the customer (e.g., where the customer is on a "Pro" plan, the content may include something about features available only to a better "Unlimited" plan to induce the customer to upgrade). The video handler 470 may obtain the selected content from the interaction tool 410 to display in the private web session. The video handler 470 may display the selected content in the private web session as a visual representation of the estimated wait time, a video, a questionnaire, an interactive game, or any combination thereof.

When the selected agent 407 becomes available, the selected agent 407 initiates a video call with the user 405 via meeting channel 480. The meeting channel 480 may be established by the video handler 470 or the interaction tool 410. Initiating the video call ends the private web session.

Figure 5:
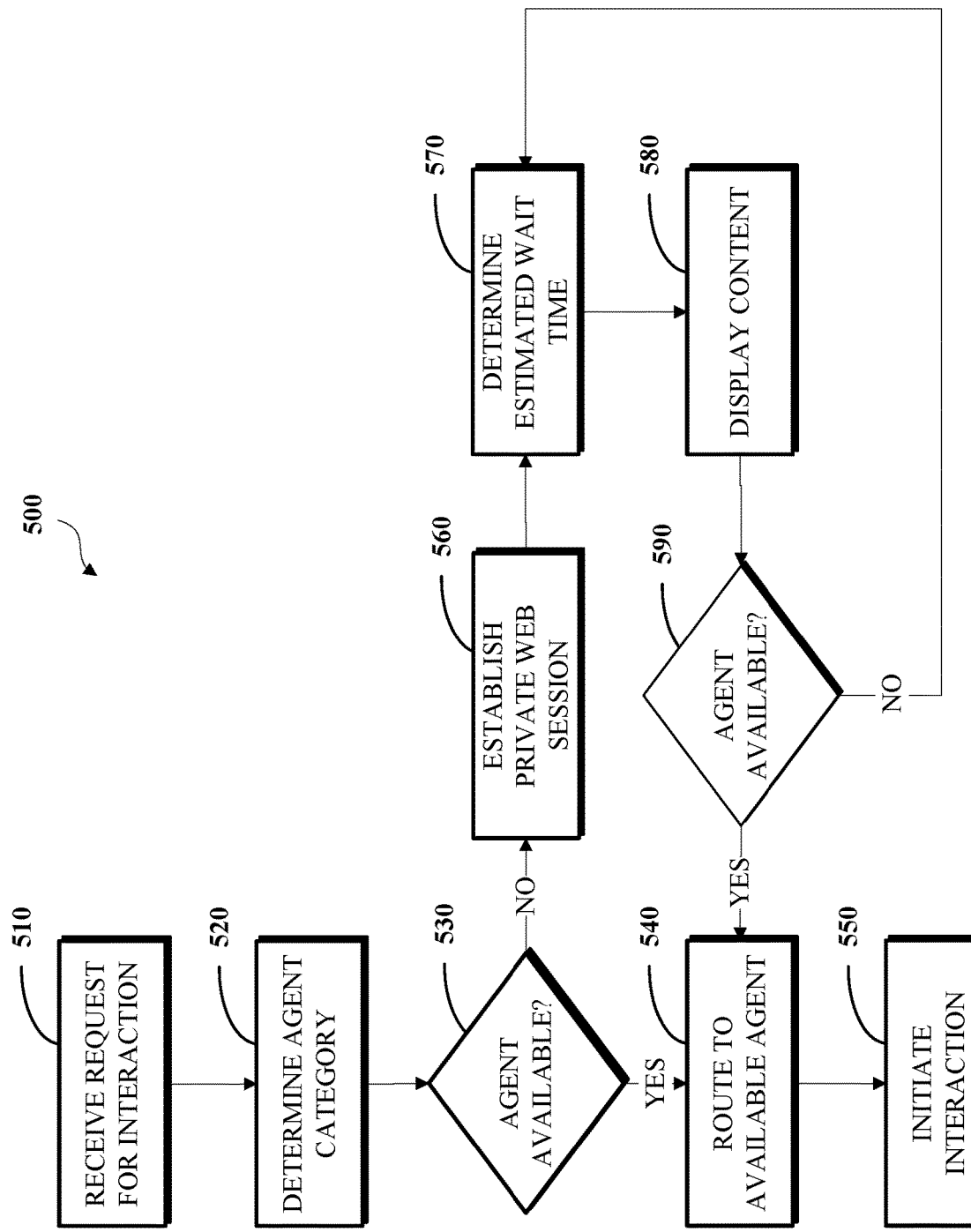
FIG. 5 is a flow diagram of an example of a method for video call queuing.

FIG. 5 is a flow diagram of an example of a method 500 for video call queuing. The method 500 includes receiving 510 a request for an interaction with an agent of a contact center. The request may, for example, be a request for a video meeting with an agent, a request for a telephone call with an agent, a request for a chat with an agent, or the like. The particular manner of the request may be based on the manner in which the request is transmitted. For example, where the user 405 is making a telephone call to the contact center, the request may be a request for a telephone call with an agent. In another example, where the user 405 is initiating a video meeting with a contact center, the request may be a request for a video meeting with an agent. The request may be received from a user vial a web portal. The request may indicate one or more reasons for the interaction, for example, in a category field of the request. In some examples, the category field may indicate a department within an organization that the user wishes to connect with via an interaction.

The method 500 includes determining 520 an agent category in order to route the request to an appropriate agent. The agent category may be determined based on the request, for example, the category field of the request. Determining 520 an agent category may include matching one or more skills of the agent with the category of the request. The one or more skills of the agent may include expertise in certain software of a UCaaS platform, technical support versus marketing, specialty in addressing billing questions or scheduling appointments, technical expertise, marketing expertise, or the like, for example. For example, if the request indicates that the reason the user is requesting an interaction is associated with a problem with a dishwasher, the user will be matched with an agent that has experience with dishwashers.

The method 500 includes determining 530 whether an agent with the appropriate skills is available. If the agent is available, the method 500 includes routing 540 the request to the available agent. Once the agent is notified of the request, the agent may initiate 550 the interaction.

If the agent is not available, the method 500 includes establishing 560 a private web session for the user and entering the user into a video call queue. The private web session may be generated by a video handler, such as video handler 470 shown in FIG. 4. The private web session may be a single user waiting room. The user may be prioritized in the video call queue. For example, the user may be prioritized on a first-in first-out (FIFO) manner or an enhanced user status. For example, if the user has purchased a priority membership or obtained a level of customer loyalty, the user may be assigned a higher priority than another user that has not purchased the priority membership or obtained the level of customer loyalty. In an example where the user has an enhanced user status, the user may be entered into a separate video call queue for enhanced users. In an example where the enhanced users and non-enhanced users are in the same queue, the enhanced users may be treated in a sub-stack format (i.e., last-in, first-out manner).

The method 500 includes determining 570 an estimated wait time. The estimated wait time may be determined based on the number of users in the video call queue, the types of issues that the users in the video call queue are having, estimated time to resolve those issues based on previous interaction data, or any combination thereof. For example, the estimated wait time may be determined based on an average historical interaction wait time multiplied by the number of users ahead in the video call queue. In another example, the estimated wait time may be based on an average historical interaction wait time to resolve the issues of the users ahead in the video call queue. The estimated wait time may be determined using machine learning techniques.

The method 500 includes displaying 580 content to the user in the private web session. The content may provide a pseudo-meeting experience for the user and may in some cases be interactive. The content is intelligently searched for and obtained from a data store, such as the studio flow store 460 shown in FIG. 4. The intelligent search may be based on prior interaction data. The content may include a visual representation of the estimated wait time, a video, a questionnaire, an interactive game, or any combination thereof. The videos may be informational, and may be based on the request, the estimated wait time, or both. The games may be timed games such that the user must complete a task or mission by the time the estimated wait time expires and the interaction begins.

The method 500 includes determining 590 whether an agent with the appropriate skills is available. If the agent is not available, the method 500 returns to determining 570 an estimated wait time. If the agent is available, the method 500 includes routing 540 the request to the available agent. Once the agent is notified of the request, the agent may initiate 550 the interaction. A notification may be sent in the form of an instant message, an SMS message, an email, an audible notification, or a video notification. In an example where the agent receives the notification while engaged in an interaction with another user, the agent may initiate 550 the interaction when the agent becomes available. Initiating the interaction includes transferring the private web session to a virtual meeting session between the agent and the user. Initiating the interaction includes removing the user from the video call queue and updating the video call queue for the remaining users in active private web sessions.

Figure 6:
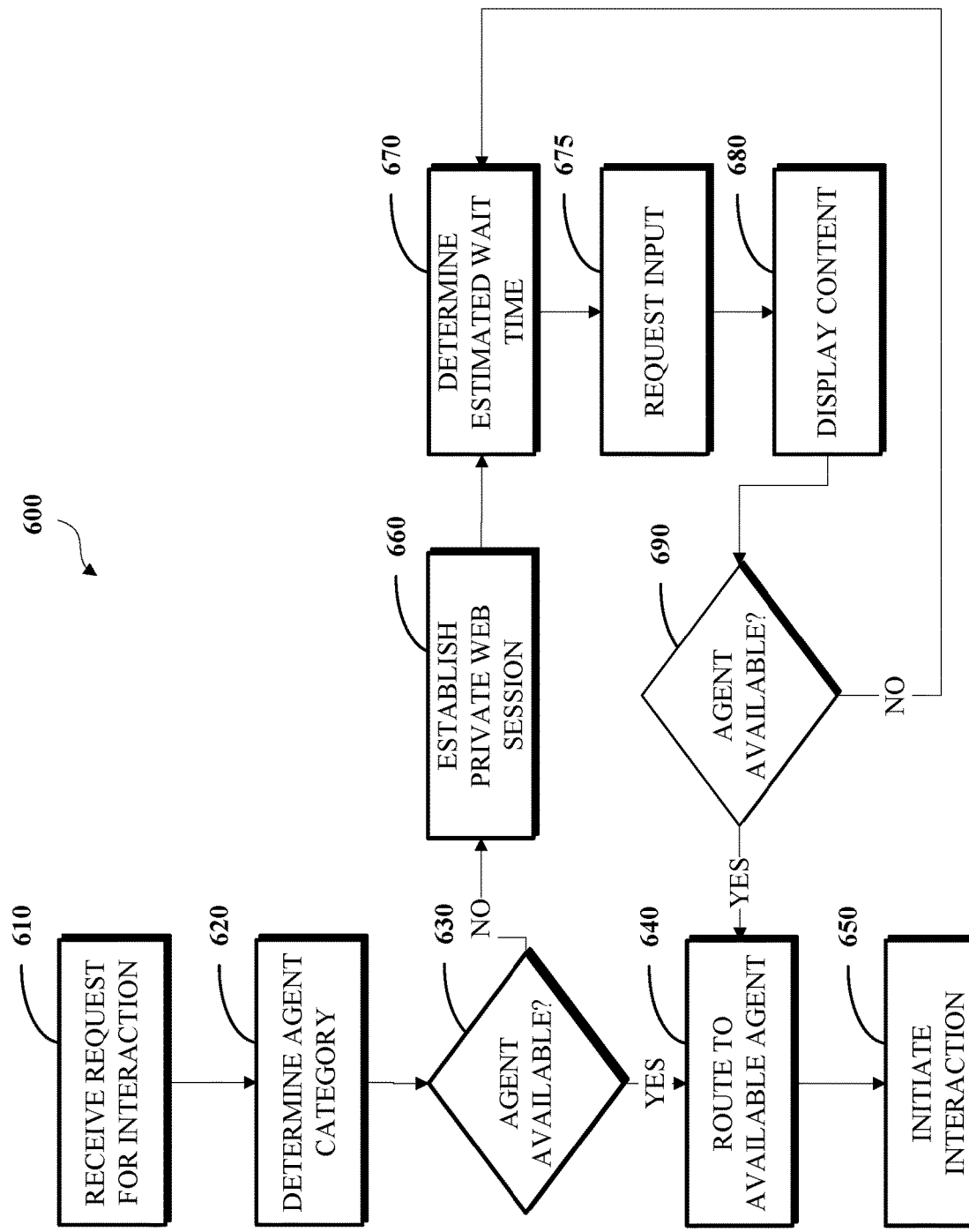
FIG. 6 is a flow diagram of another example of a method for video call queuing.

FIG. 6 is a flow diagram of another example of a method 600 for video call queuing. The method 600 includes receiving 610 a request for an interaction with an agent of a contact center. The request may, for example, be a request for a video meeting with an agent, a request for a telephone call with an agent, a request for a chat with an agent, or the like. The particular manner of the request may be based on the manner in which the request is transmitted. For example, where the user is making a telephone call to the contact center, the request may be a request for a telephone call with an agent. In another example, where the user is initiating a video meeting with a contact center, the request may be a request for a video meeting with an agent. The request may be received from a user vial a web portal. The request may indicate one or more reasons for the interaction, for example, in a category field of the request. In some examples, the category field may indicate a department within an organization that the user wishes to connect with via an interaction.

The method 600 includes determining 620 an agent category in order to route the request to an appropriate agent. The agent category may be determined based on the request, for example, the category field of the request. The agent category may include information about the nature of the request to aid in determining an appropriate agent to handle the interaction. Determining 620 an agent category may include matching one or more skills of the agent with the category of the request. The one or more skills of the agent may include expertise in certain software of a UCaaS platform, technical support versus marketing, specialty in addressing billing questions or scheduling appointments, technical expertise, marketing expertise, or the like, for example. For example, if the request indicates that the reason the user is requesting an interaction is associated with a problem with a dishwasher, the user will be matched with an agent that has experience with dishwashers.

The method 600 includes determining 630 whether an agent with the appropriate skills is available. If the agent is available, the method 600 includes routing 640 the request to the available agent. Once the agent is notified of the request, the agent may initiate 650 the interaction.

If the agent is not available, the method 600 includes establishing 660 a private web session for the user and entering the user into a video call queue. The private web session may be generated by a video handler, such as video handler 470 shown in FIG. 4. The private web session may be a single user waiting room. The user may be prioritized in the video call queue. For example, the user may be prioritized on a FIFO manner or an enhanced user status. For example, if the user has purchased a priority membership or obtained a level of customer loyalty, the user may be assigned a higher priority than another user that has not purchased the priority membership or obtained the level of customer loyalty.

The method 600 includes determining 670 an estimated wait time. The estimated wait time may be determined based on the number of users in the video call queue, the types of issues that the users in the video call queue are having, estimated time to resolve those issues based on previous interaction data, or any combination thereof. For example, the estimated wait time may be determined based on an average historical interaction wait time multiplied by the number of users ahead in the video call queue. In another example, the estimated wait time may be based on an average historical interaction wait time to resolve the issues of the users ahead in the video call queue. The estimated wait time may be determined using machine learning techniques.

The method 600 includes requesting 675 input from the user. The input may be requested by visually presenting the user with an interactive questionnaire. The interactive questionnaire may include questions based on the request, and may be used to gather relevant information based on the user responses for the agent in order to reduce the duration of the interaction. In some examples, the input may be presented by the user in response to questions or information displayed in the private web session. The interactive questionnaire may include, for example, patient request forms from a physician's office, surveys, games, quizzes, or the like. The input may be requested or presented before or after displaying the content to the user in the private web session. For example, the selected content may be based on the input and the requested input may be based on the content.

The method 600 includes displaying 680 content to the user in the private web session. The content may provide a pseudo-meeting experience for the user and may be interactive. The content is intelligently searched for and obtained from a data store, such as the studio flow store 460 shown in FIG. 4. The content may include a visual representation of the estimated wait time, a video, an interactive game, or any combination thereof. The videos may be informational, and may be based on the request, the questionnaire responses, the estimated wait time, or any combination thereof. The games may be timed games such that the user must complete a task or mission by the time the estimated wait time expires and the interaction begins.

The method 600 includes determining 690 whether an agent with the appropriate skills is available. If the agent is not available, the method 600 returns to determining 670 an estimated wait time. If the agent is available, the method 600 includes routing 640 the request to the available agent. Once the agent is notified of the request, the agent may initiate 650 the interaction. A notification may be sent in the form of an instant message, an SMS message, an email, an audible notification, or a video notification. In an example where the agent receives the notification while engaged in an interaction with another user, the agent may initiate 650 the interaction when the agent becomes available. Initiating the interaction includes transferring the private web session to a virtual meeting session between the agent and the user. Initiating the interaction includes removing the user from the video call queue and updating the video call queue for the remaining users in active private web sessions.

Figure 7:
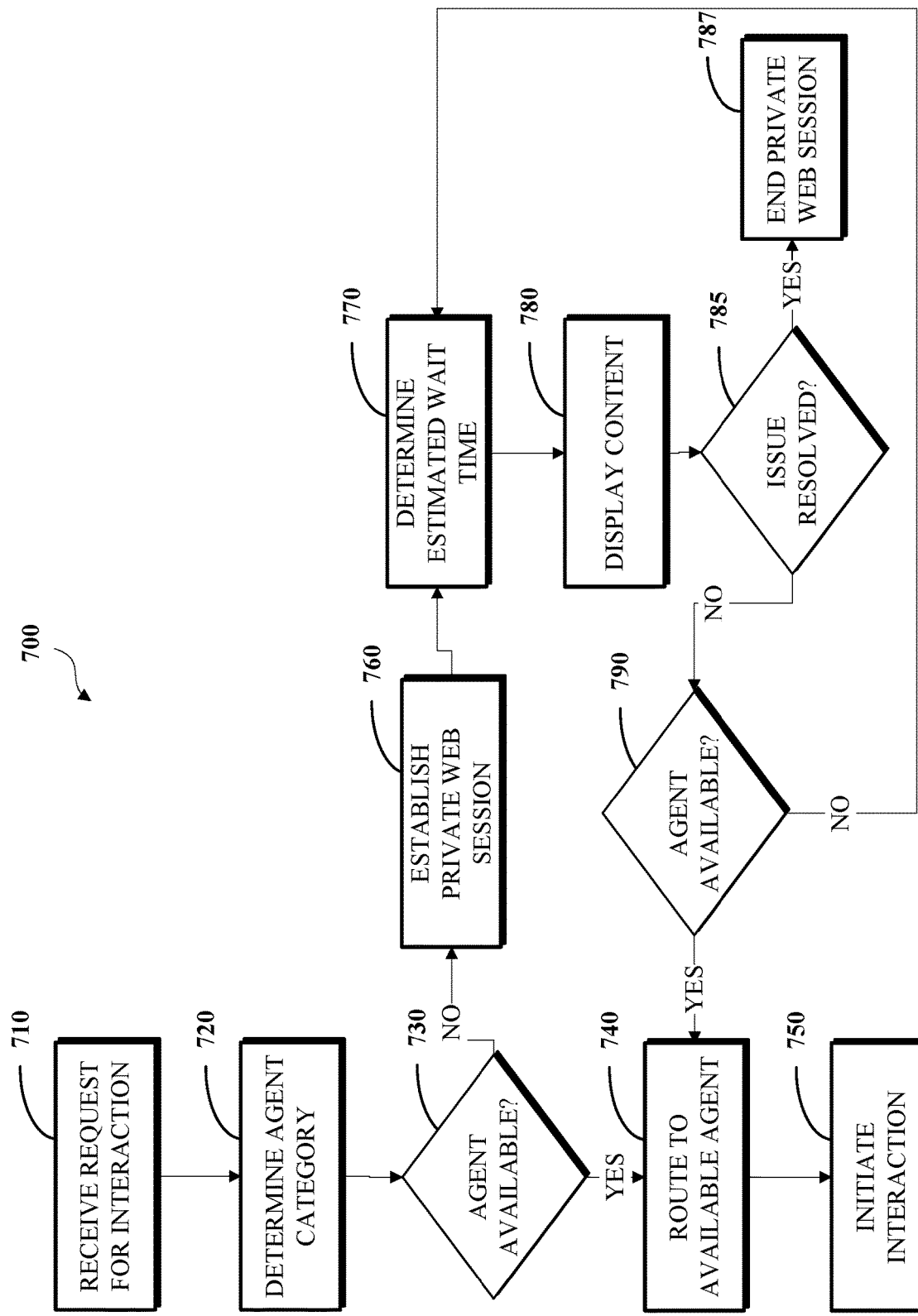
FIG. 7 is a flow diagram of another example of a method for video call queuing.

FIG. 7 is a flow diagram of another example of a method 700 for video call queuing. The method 700 includes receiving 710 a request for an interaction with an agent of a contact center. The request may, for example, be a request for a video meeting with an agent, a request for a telephone call with an agent, a request for a chat with an agent, or the like. The particular manner of the request may be based on the manner in which the request is transmitted. For example, where the user is making a telephone call to the contact center, the request may be a request for a telephone call with an agent. In another example, where the user is initiating a video meeting with a contact center, the request may be a request for a video meeting with an agent. The request may be received from a user via a web portal. The request may indicate one or more reasons for the interaction, for example, in a category field of the request. In some examples, the category field may indicate a department within an organization that the user wishes to connect with via an interaction.

The method 700 includes determining 720 an agent category in order to route the request to an appropriate agent. The agent category may be determined based on the request, for example, the category field of the request. The agent category may include information about the nature of the request to aid in determining an appropriate agent to handle the interaction. Determining 720 an agent category may include matching one or more skills of the agent with the category of the request. The one or more skills of the agent may include expertise in certain software of a UCaaS platform, technical support versus marketing, specialty in addressing billing questions or scheduling appointments, technical expertise, marketing expertise, or the like, for example. For example, if the request indicates that the reason the user is requesting an interaction is associated with a problem with a dishwasher, the user will be matched with an agent that has experience with dishwashers.

The method 700 includes determining 730 whether an agent with the appropriate skills is available. If the agent is available, the method 700 includes routing 740 the request to the available agent. Once the agent is notified of the request, the agent may initiate 750 the interaction.

If the agent is not available, the method 700 includes establishing 760 a private web session for the user and entering the user into a video call queue. The private web session may be generated by a video handler, such as video handler 470 shown in FIG. 4. The private web session may be a single user waiting room. The user may be prioritized in the video call queue. For example, the user may be prioritized on a FIFO manner or an enhanced user status. For example, if the user has purchased a priority membership or obtained a level of customer loyalty, the user may be assigned a higher priority than another user that has not purchased the priority membership or obtained the level of customer loyalty.

The method 700 includes determining 770 an estimated wait time. The estimated wait time may be determined based on the number of users in the video call queue, the types of issues that the users in the video call queue are having, estimated time to resolve those issues based on previous interaction data, or any combination thereof. For example, the estimated wait time may be determined based on an average historical interaction wait time multiplied by the number of users ahead in the video call queue. In another example, the estimated wait time may be based on an average historical interaction wait time to resolve the issues of the users ahead in the video call queue. The estimated wait time may be determined using machine learning techniques.

The method 700 includes displaying 780 content to the user in the private web session. The content may provide a pseudo-meeting experience for the user and may be interactive. The content is intelligently searched for and obtained from a data store, such as the studio flow store 460 shown in FIG. 4. The content may include a visual representation of the estimated wait time, a video, an interactive game, or any combination thereof. In some examples, the content may include visually presenting the user with an interactive questionnaire. The interactive questionnaire may include questions based on the request, and may be used to search for relevant content based on the user responses. The videos may be informational, and may be based on the request, the questionnaire responses, the estimated wait time, or any combination thereof. The games may be timed games such that the user must complete a task or mission by the time the estimated wait time expires and the interaction begins.

The method 700 includes determining 785 whether the issue is resolved. For example, the user may be audibly or visually presented with a question asking whether the content provided resolved the issue or was usable to resolve the issue. The user may respond with an audible response or via an interface, such as a graphical user interface (GUI) output for display on the device being used for the interaction. If the user responds that the issue is resolved, the method 700 includes ending 787 the private web session, for example, by disconnecting the user from the video handler 470 shown in FIG. 4.

If the user responds that the issue is not resolved, the method 700 includes determining 790 whether an agent with the appropriate skills is available. If the agent is not available, the method 700 returns to determining 770 an estimated wait time. If the agent is available, the method 700 includes routing 740 the request to the available agent. Once the agent is notified of the request, the agent may initiate 750 the interaction. A notification may be sent in the form of an instant message, an SMS message, an email, an audible notification, or a video notification. In an example where the agent receives the notification while engaged in an interaction with another user, the agent may initiate 750 the interaction when the agent becomes available. Initiating the interaction includes transferring the private web session to a virtual meeting session between the agent and the user. Initiating the interaction includes removing the user from the video call queue and updating the video call queue for the remaining users in active private web sessions.

Figure 8:
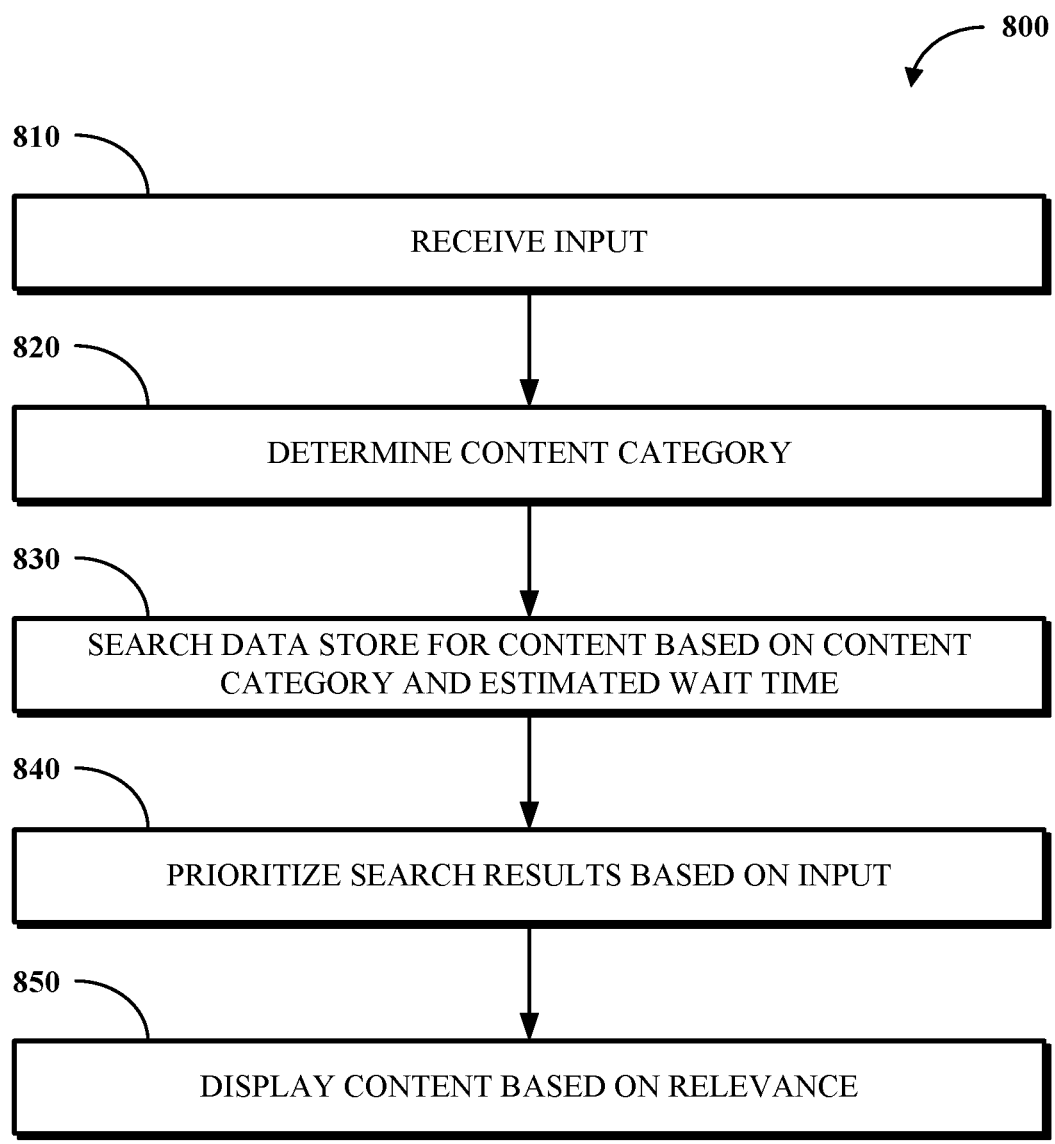
FIG. 8 is a flowchart of an example of a method for content selection for video call queuing.

FIG. 8 is a flowchart of an example of a method 800 for content selection for video call queuing. The method 800 includes receiving 810 an input. The input may be received as a request for an interaction. The request may be received from a user vial a web portal. The request may indicate one or more reasons for the interaction, for example, in a category field of the request. In some examples, the category field may indicate a department within an organization that the user wishes to connect with via an interaction. In some examples, the input may include user responses obtained during a private web session.

The method 800 includes determining 820 a content category. The content category may be determined based on the input. The method 800 includes searching 830 a data store for content. The data store may be a data store such as the studio flow store 470 shown in FIG. 4, for example. The data store may be searched for content based on the content category, an estimated wait time, or both. For example, if the content category is associated with a refrigerator compressor and the estimated wait time is approximately ten minutes, the method 500 may search the data store for one or more videos related to refrigerator compressors that total the estimated wait time of approximately ten minutes.

The method 800 may include prioritizing 840 the search results. The search results may be prioritized based on input. For example, the input may be used to determine a relevance of the content to the request. A relevance score may be determined for each identified content item. For example, each identified content item may include one or more tags associated with the respective content item. The input may include metadata that is matched with the one or more tags of the identified content items. The relevance score may be based on the number of matching tags. For example, if an identified content item contains 3 matching tags, it will have a higher relevance score than an identified content item that contains 1 matching tag. The content may be displayed 850 to the user based on the relevance score.

Figure 9:
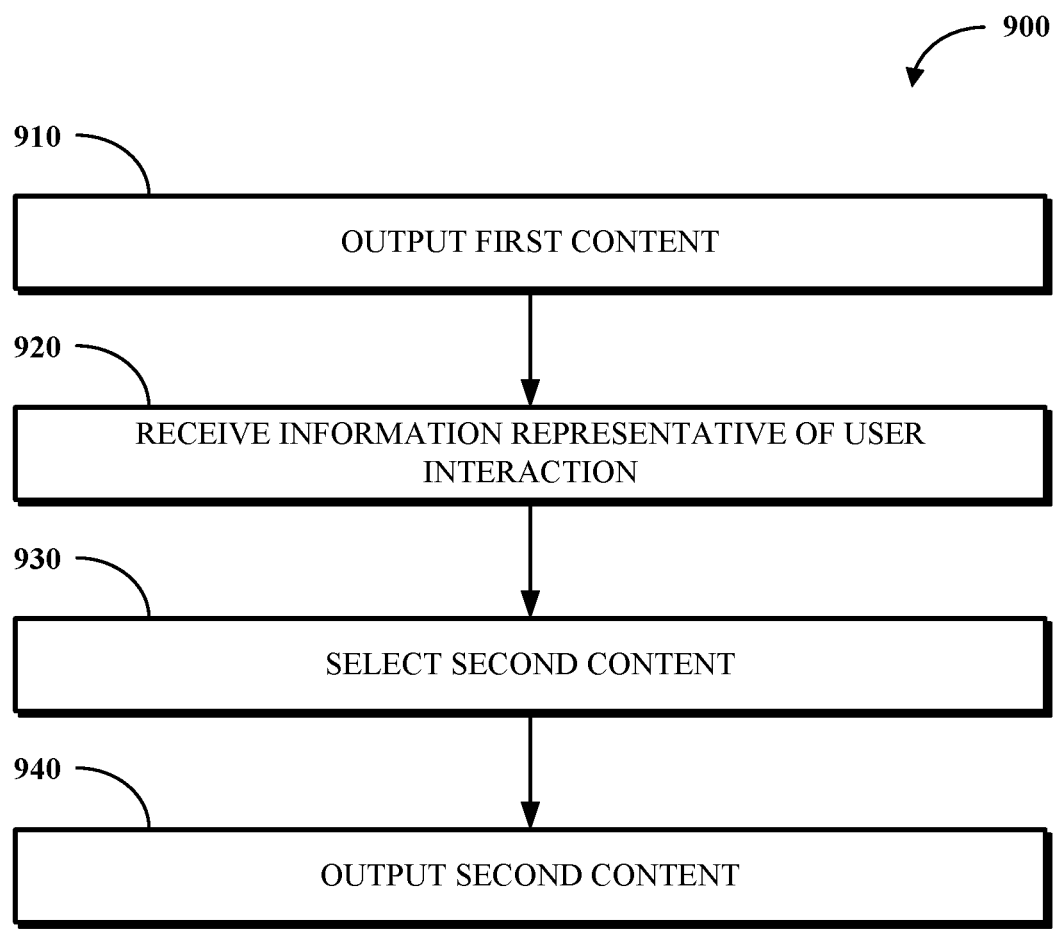
FIG. 9 is a flowchart of an example of a method for content interaction-based selection for video call queuing.

FIG. 9 is a flowchart of an example of a method 900 for content interaction-based selection for video call queuing. The method 900 includes outputting 910 first content. The first content may be selected based on a determined content category through the video call queue. The first content may include a visual representation of the estimated wait time, a video, an interactive game, or any combination thereof. In some examples, the content may include visually presenting the user with an interactive questionnaire. The interactive questionnaire may include questions based on a request, and may be used to search for relevant content based on the user responses. Outputting 910 the first content may include displaying the second content to the user in the private web session.

The method 900 includes receiving 920 information representative of user interaction with the first content. The information received may include user responses to a questionnaire or survey, for example.

The method 900 includes selecting 930 second content. The second content may include a visual representation of the estimated wait time, a video, an interactive game, or any combination thereof. In some examples, the content may include visually presenting the user with an interactive questionnaire. The interactive questionnaire may include questions based on a request, and may be used to search for relevant content based on the user responses. The second content may be selected based on the user interaction with the first content. The videos may be informational, and may be based on the request, the questionnaire responses, the estimated wait time, or any combination thereof. The games may be timed games such that the user must complete a task or mission by the time the estimated wait time expires and the interaction begins.

The method 900 includes outputting 940 the second content. Outputting 940 the second content may include displaying the second content to the user in the private web session.

The methods 800 and 900 can be executed using computing devices, such as the systems, hardware, and software described with respect to FIGS. 1-7. The methods 800 and 900 can be performed, for example, by executing a machine-readable program or other computer-executable instructions, such as routines, instructions, programs, or other code. The steps, or operations, of the methods 800 and 900 or another technique, method, process, or algorithm described in connection with the implementations disclosed herein can be implemented directly in hardware, firmware, software executed by hardware, circuitry, or a combination thereof.

For simplicity of explanation, the methods 800 and 900 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

In some implementations, a method includes receiving a request for an interaction with an agent of a contact center. The method includes establishing a private web session based on the agent being unavailable for the interaction. The method includes determining an estimated wait time for the interaction. The method includes selecting visual content based on matching the estimated wait time with one or more visual content items. The method includes outputting the visual content to the private web session. In one or more implementations, the method may include determining that the agent is available during the output of the visual content to the private web session. In one or more implementations, the method may include initiating the interaction based on the determination that the agent is available. In one or more implementations, the interaction is at least one of a video meeting, a telephone call, or a chat. In one or more implementations, the private web session may be an interactive web session. In one or more implementations, the private web session may be configured to obtain information for use in the interaction. In one or more implementations, the request may include CRM metadata including a user name, a user address, a user membership status, a user priority, a user purchase history, a user call history, or any combination thereof. In one or more implementations, the contact center may be associated with at least one of a merchant or a service provider.

In some implementations, a non-transitory computer-readable storage device is configured to store instructions that when executed by a processor, cause the processor to perform operations. The operations include receiving a request for an interaction with an agent of a contact center. The operations include establishing a private web session based on the agent being unavailable for the interaction. The operations include determining an estimated wait time for the interaction. The operations include selecting visual content based on matching the estimated wait time with one or more visual content items. The operations include outputting the visual content to the private web session. In one or more implementations, the operations may include determining that the agent is available during the output of the visual content to the private web session. In one or more implementations, the operations may include initiating the interaction based on the determination that the agent is available. In one or more implementations, the interaction may be at least one of a video meeting, a telephone call, or a chat. In one or more implementations, the private web session may be an interactive web session. In one or more implementations, the private web session may be configured to obtain information for use in the interaction. In one or more implementations, the request may include CRM metadata including a user name, a user address, a user membership status, a user priority, a user purchase history, a user call history, or any combination thereof. In one or more implementations, the contact center may be associated with at least one of a merchant or a service provider.

In some implementations, a system includes a ticket system configured to receive a request for an interaction with an agent of a contact center. The system includes an interaction tool configured to establish a private web session based on the agent being unavailable for the interaction. The interaction tool is configured to determine an estimated wait time for the interaction. The interaction tool is configured to select visual content based on matching the estimated wait time with one or more visual content items. The system includes a video handler configured to output the visual content to the private web session. In one or more implementations, the interaction tool may be configured to determine that the agent is available during the output of the visual content to the private web session. In one or more implementations, the system may include a task router configured to initiate the interaction based on the determination that the agent is available. In one or more implementations, the interaction may be at least one of a video meeting, a telephone call, or a chat. In one or more implementations, the private web session may be an interactive web session. In one or more implementations, the interaction tool may be configured to obtain information via the private web session for use in the interaction. In one or more implementations, the request may include CRM metadata including a user name, a user address, a user membership status, a user priority, a user purchase history, a user call history, or any combination thereof.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
receiving a request for an interaction with an agent of a contact center;
establishing a private web session based on the agent being unavailable for the interaction;
determining an estimated wait time for the interaction;
selecting content based on matching the estimated wait time with one or more content items; and
outputting the content to the private web session.

2. The method of claim 1, comprising:
determining that the agent is available during the output of the content to the private web session; and
initiating the interaction based on the determination that the agent is available.

3. The method of claim 1, wherein the interaction is at least one of a video meeting, a telephone call, or a chat.

4. The method of claim 1, wherein the private web session is an interactive web session.

5. The method of claim 1, wherein the private web session is configured to obtain information for use in the interaction.

6. The method of claim 1, wherein the request includes customer relationship management (CRM) metadata including at least one of a user name, a user address, a user membership status, a user priority, a user purchase history, or a user call history.

7. The method of claim 1, wherein the contact center is associated with at least one of a merchant or a service provider.

8. A non-transitory computer-readable storage device configured to store instructions that when executed by a processor, cause to processor to perform operations, the operations comprising:
receiving a request for an interaction with an agent of a contact center;
establishing a private web session based on the agent being unavailable for the interaction;
determining an estimated wait time for the interaction;
selecting content based on matching the estimated wait time with one or more content items; and
outputting the content to the private web session.

9. The non-transitory computer-readable storage device of claim 8, wherein the instructions, when executed by the processor, cause the processor to perform operations, the operations comprising:
determining that the agent is available during the output of the content to the private web session; and
initiating the interaction based on the determination that the agent is available.

10. The non-transitory computer-readable storage device of claim 8, wherein the interaction is at least one of a video meeting, a telephone call, or a chat.

11. The non-transitory computer-readable storage device of claim 8, wherein the private web session is an interactive web session.

12. The non-transitory computer-readable storage device of claim 8, wherein the private web session is configured to obtain information for use in the interaction.

13. The non-transitory computer-readable storage device of claim 8, wherein the request includes customer relationship management (CRM) metadata including at least one of a user name, a user address, a user membership status, a user priority, a user purchase history, or a user call history.

14. The non-transitory computer-readable storage device of claim 8, wherein the contact center is associated with at least one of a merchant or a service provider.

15. A system comprising:
a ticket system configured to receive a request for an interaction with an agent of a contact center;
an interaction tool configured to:
establish a private web session based on the agent being unavailable for the interaction;
determine an estimated wait time for the interaction; and select content based on matching the estimated wait time with one or more content items; and a content handler configured to output the content to the private web session.

16. The system of claim 15, wherein the interaction tool is configured to determine that the agent is available during the output of the content to the private web session, the system comprising:

a task router configured to initiate the interaction based on the determination that the agent is available.

17. The system of claim 15, wherein the interaction is at least one of a video meeting, a telephone call, or a chat.

18. The system of claim 15, wherein the private web session is an interactive web session.

19. The system of claim 15, wherein the interaction tool is configured to obtain information via the private web session for use in the interaction.

20. The system of claim 15, wherein the request includes customer relationship management (CRM) metadata including at least one of a user name, a user address, a user membership status, a user priority, a user purchase history, or a user call history.

* * * * *